No. 685,068. Patented Oct. 22, 1901.
C. SIMMONS.
BINDING HOOK.
(Application filed June 1, 1901.)
(No Model.)

Witnesses
Harry L. Amer
H. Schmidt

Inventor
Charley Simmons.
By Victor J. Evans
Attorney.

THE NORRIS PETERS CO., PHOTO-LITHO., WASHINGTON, D. C.

UNITED STATES PATENT OFFICE.

CHARLEY SIMMONS, OF HAYDEN, INDIANA.

BINDING-HOOK.

SPECIFICATION forming part of Letters Patent No. 685,068, dated October 22, 1901.

Application filed June 1, 1901. Serial No. 62,780. (No model.)

*To all whom it may concern:*

Be it known that I, CHARLEY SIMMONS, a citizen of the United States, residing at Hayden, in the county of Jennings and State of Indiana, have invented new and useful Improvements in Binding-Hooks, of which the following is a specification.

This invention relates to binding-hooks; and the object of the invention is to provide, in connection with one of the standards of a hay-wagon, a hook mounted thereon in such manner as to automatically clutch or obtain a firm hold on such standard at any point in the length thereof, which hook is also adapted to engage with one end of the binding-pole, which extends lengthwise of the load of hay, so that a single operator may securely bind a load of hay upon the wagon without assistance. The construction of the hook and its engagement with the standard is such that when the binding-pole is drawn downward the hook automatically works its way down the standard and when the binding-pole is released by the operator the binding-hook acts to automatically clutch and firmly engage the standard, preventing the upward movement or escape of the binding-pole.

With the above and other objects in view the invention consists in the novel construction, combination, and arrangement of parts hereinafter fully described, illustrated, and claimed.

Figure 1:
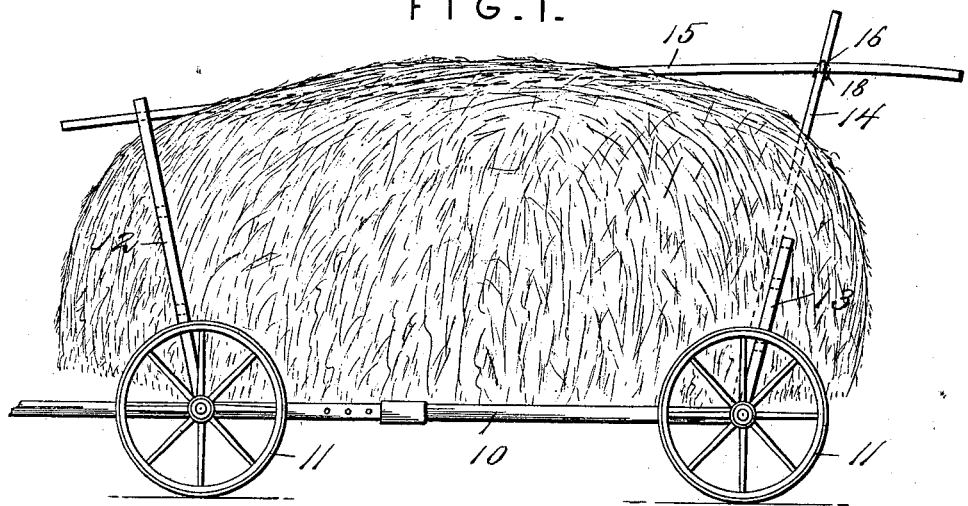
Figure 2:
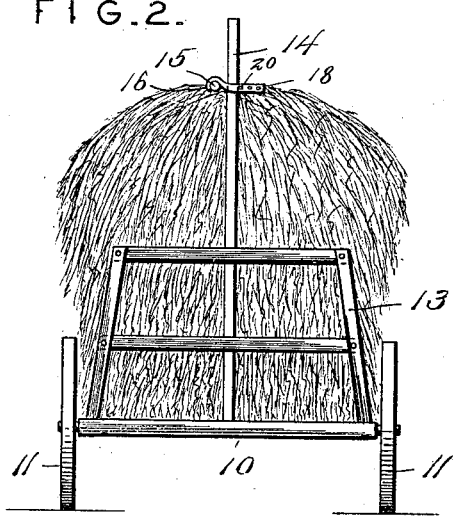
Figure 3:
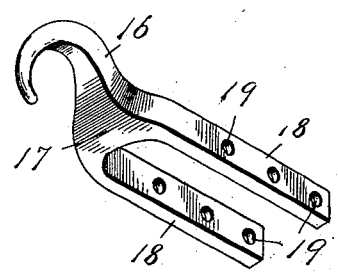
Figure 4:
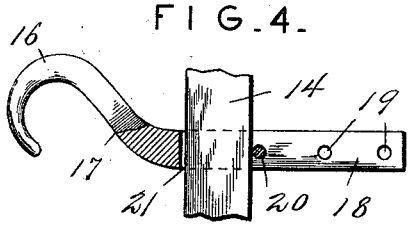
Figure 5:
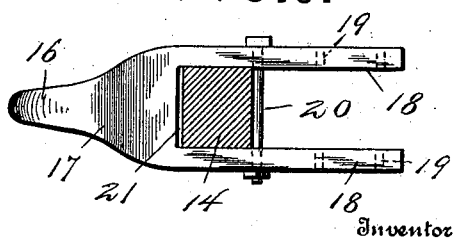

In the accompanying drawings, Figure 1 is a side elevation of a wagon, showing the application of the binding-hook to the hay-rigging. Fig. 2 is a rear elevation of the same. Fig. 3 is an enlarged detail perspective view of the hook *per se*. Fig. 4 is a sectional view of the hook, showing the engagement between the hook and rear standard of the wagon. Fig. 5 is a plan view of the hook, showing the standard in section.

Similar numerals of reference designate corresponding parts in all the figures of the drawings.

Referring to the drawings, 10 designates the bed of a wagon of ordinary construction, provided with carrying-wheels 11 and also provided with front and rear upstanding frames 12 and 13, respectively, the wagon being in these and other respects similar to ordinary hay-wagons now in common use.

In carrying out the present invention I employ, by preference, a single standard or staff 14 at the rear of the wagon, and in connection therewith I employ the usual binding-pole 15, which extends lengthwise of the wagon and the load and operates against the top of the load to bind the hay firmly on the body of the wagon and between the end frames 12 and 13, as illustrated in Figs. 1 and 2. The standard 14 and pole 15 may be square or round or of any other desired shape in cross-section.

The hook which I employ in connection with the standard and pole is indicated in detail in Fig. 3, the hook proper being designated by the numeral 16. The hook 16 is provided with a broadened base 17, which forms the crown of a fork, the arms 18 of which extend substantially parallel to each other, with a space between them equal to or slightly greater than the thickness of the standard 14, which said arms or branches are adapted to straddle, as shown in Figs. 2, 4, and 5. The arms 18 are also provided with oppositely-located openings 19 for the reception of a pin or bolt 20. A series of such holes is provided, so that the pin or bolt may be adjusted any desired distance from the shoulder 21, formed by the inner surface of the crown of the fork. In applying the hook to the standard or staff 14 the pin or bolt 20 is adjusted so that the space between it and the shoulder 21 is only slightly greater than the thickness of the staff, as shown in Figs. 4 and 5, thus enabling the hook as a whole to slide freely on the standard 14 and gravitate downward thereon as the binding-pole 15 is drawn downward by the operator.

In operation the hook is placed upon the standard, as previously indicated, and the binding-pole 15 is caught at one end under one of the cross-pieces of the frame 12, while its rear portion is passed under and placed in engagement with the hook 16. The operator then grasps the rear extremity of the binding-pole, and in drawing the same downward the hook is left free to slide downward on the standard 14. As soon as the binding-pole is relieved of the weight or pulling strain applied to the end thereof, however, the pole by its upward pressure acts to cant the hook, and the shoulder 21 is thereby caused to bind against the staff, with the result that the hook is prevented from moving upward on the standard. Thus the load of hay is securely bound upon the wagon, and the operation may be accomplished by a single operator without the assistance of others.

The device hereinabove set forth effects a great saving in rope and other tackle ordinarily employed for the purpose described, and will be found of great convenience to farmers, effecting a saving in time, labor, and expense.

Having thus described the invention, what is claimed as new, and desired to be secured by Letters Patent, is—

The combination with a wagon provided with hay-rigging embodying a standard, and a binding-pole; of a hook adapted to engage the binding-pole and provided with a fork adapted to straddle the standard of the hay-rigging, the arms of said fork being provided with oppositely-located openings, and a pin or bolt detachably mounted in said openings and adjustable toward and away from the crown of the fork, the standard being received between such pin or bolt and the crown of the fork, whereby the hook as a whole is adapted to slide downward on the standard and to clutch the same when upward pressure is applied to the hook, substantially as described.

In testimony whereof I affix my signature in presence of two witnesses.

CHARLEY SIMMONS.

Witnesses:
  KENNEDY F. CLAPP,
  GEORGE F. LAWRENCE.